Oct. 17, 1961  P. H. BOTTOMS ET AL  3,004,295
METHOD FOR FORMING SHEET MATERIAL
Filed Sept. 26, 1955  3 Sheets-Sheet 1

PAUL H. BOTTOMS
JOHN G. STANSBURY
ROBERT J. CLAPP
INVENTORS

BY Lyon & Lyon

ATTORNEYS

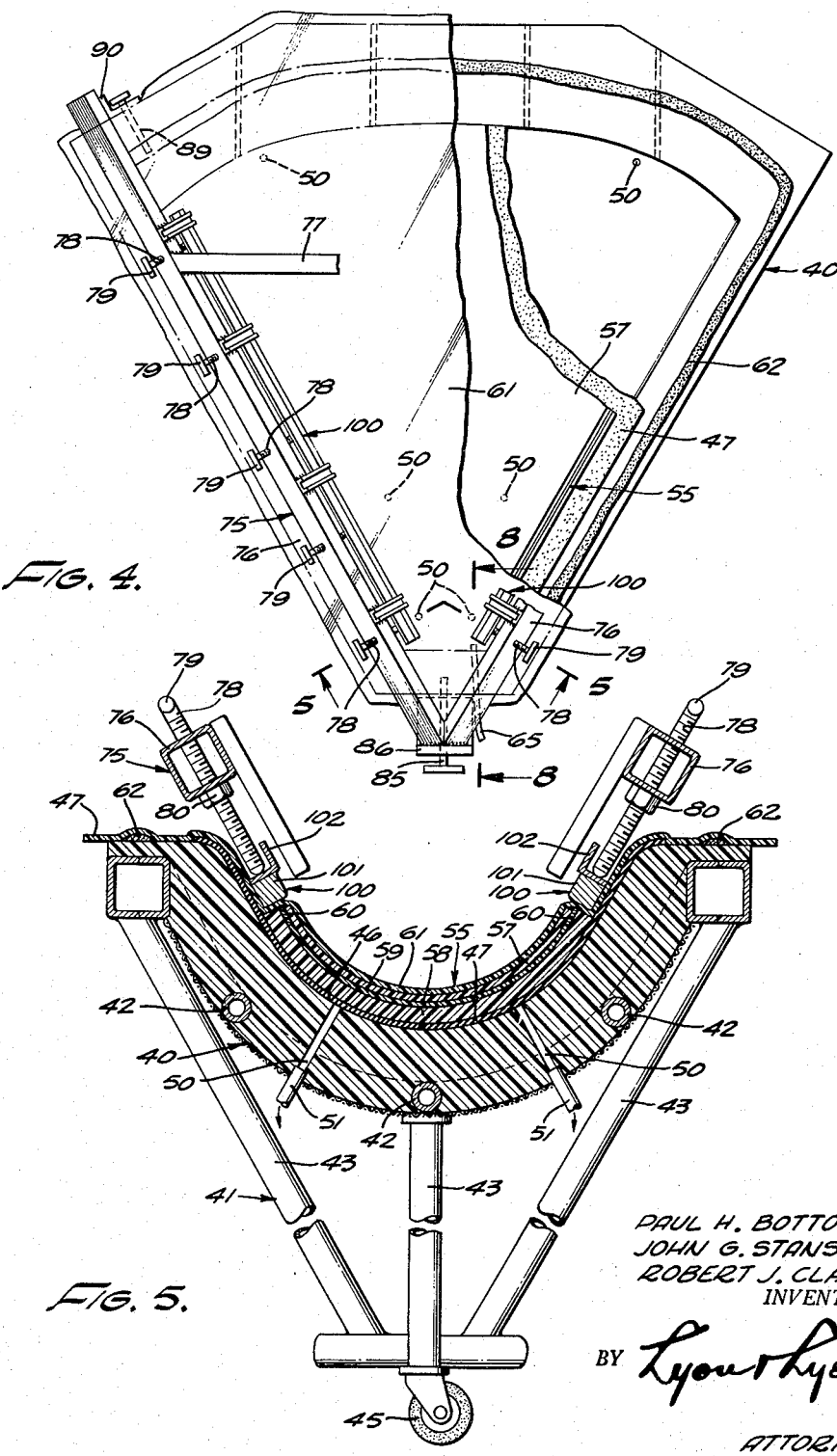

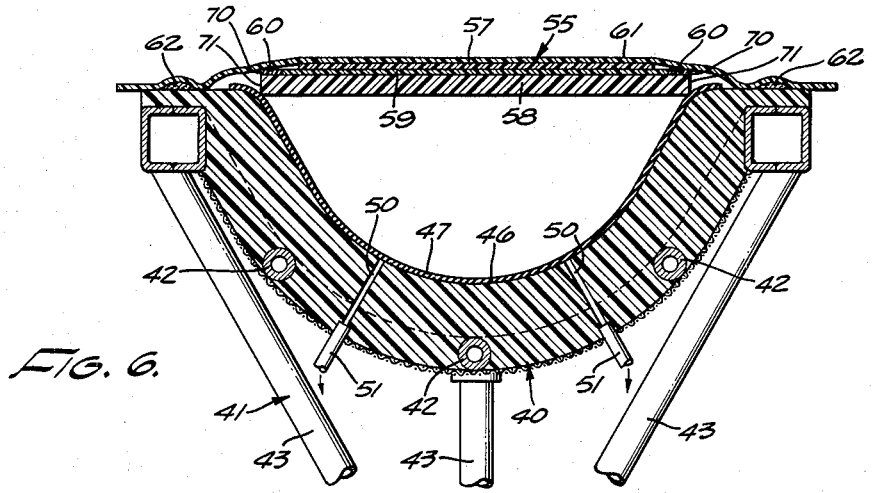
FIG. 6.
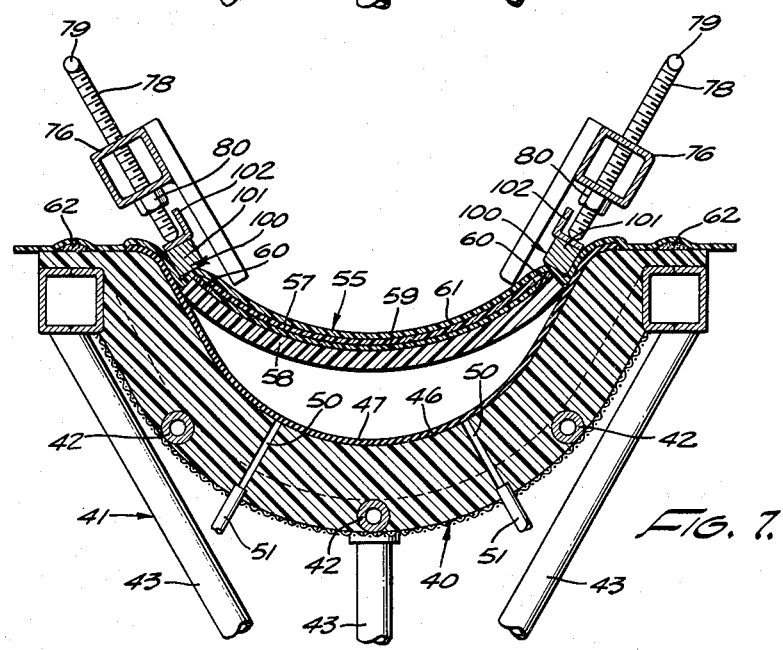
FIG. 7.
FIG. 8.
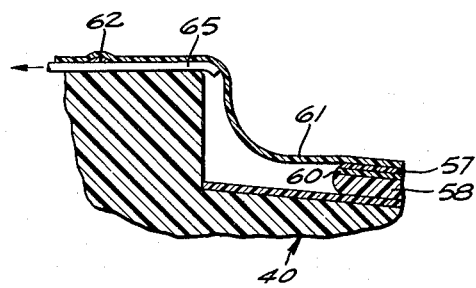
PAUL H. BOTTOMS
JOHN G. STANSBURY
ROBERT J. CLAPP
INVENTORS
BY Lyon & Lyon
ATTORNEYS United States Patent Office 3,004,295
Patented Oct. 17, 1961

3,004,295
METHOD FOR FORMING SHEET MATERIAL
Paul H. Bottoms, Hollywood, John G. Stansbury, La Canada, and Robert J. Clapp, Downey, Calif., assignors to Swedlow Inc., Los Angeles, Calif., a corporation of California
Filed Sept. 26, 1955, Ser. No. 536,350
9 Claims. (Cl. 18—56)

This invention relates to the forming of plastic sheet material and has particular reference to a process for forming transparent sheets of cross-linked plastic materials into contoured articles having excellent optical properties adapting them for use as windows, cockpit enclosures, windshields and the like, for airplanes and other uses.

Transparent polyester plastic materials and other cross-linked plastics such as cross-linked acrylics (for example, Rohm & Haas Polymer K) are becoming increasingly more popular for use as the glazing material in aircraft. By reason of certain superior physical properties, the polyesters and cross-linked acrylics are supplanting, to some degree, the acrylic plastics which have long been the popular materials for such uses. Heretofore, so-called drape forming methods have been employed in shaping the flat polyester sheets into the desired curved configuration dictated by the aircraft design. Such drape forming methods involve heating the plastic sheet to the forming temperature and then placing the sheet over a contact die having the desired contour of the finished part. Clamps are then applied to the periphery of the sheet so that the contour of the sheet is maintained until it is set in the curved form. This method is limited to the production of transparent polyester articles having only slight contours, due to the inherent nature of this type of resin, particularly the brittleness of the material and the relatively large amount of shrinkage it undergoes during cooling of the material from the forming temperature. Moreover, the drape forming method is tedious and time-consuming from the standpoint of labor utilization, inasmuch as the clamps must be continually tightened during cooling of the material. The use of male and female forming dies has also been proposed for forming the transparent polyester sheets, but this method is limited to the forming of monolithic sheets and is unsuitable for use in connection with the usual polyester laminates, due to the occurrence of isolated pressure points and resultant optical distortion caused by flow of the vinyl interlayer in the areas of such pressure points. One of the principal objects of this invention is, therefore, to provide a process for forming transparent polyester sheet material, which is not subject to the above and other disadvantages of the methods heretofore proposed.

Another object of this invention is to provide a novel process for forming transparent sheets of cross-linked resinous plastic material into contoured articles having relatively small radii.

Another object of this invention is to provide a process for forming transparent polyester sheets which is relatively simple to carry out and which requires only relatively simple and inexpensive equipment.

Yet another object of this invention is to provide a novel process for forming transparent polyester sheets into contoured articles having excellent optical properties.

Other objects and advantages of this invention it is believed will be readily apparent from the following detailed description of preferred embodiments thereof when read in connection with the accompanying drawings.

In the drawings:

FIGURE 4 is a top plan view of a further modified form of the invention.

FIGURE 5 is a sectional elevation taken substantially on the line 5—5 of FIGURE 4.

FIGURE 6 is a view similar to FIGURE 5 but illustrating the polyester sheet in the initial, flat condition.

FIGURE 7 is a view similar to FIGURE 5 but illustrating the polyester sheet and the apparatus in an intermediate position during the forming process.

FIGURE 8 is a sectional elevation taken substantially on the line 8—8 of FIGURE 4.

Figure 1:
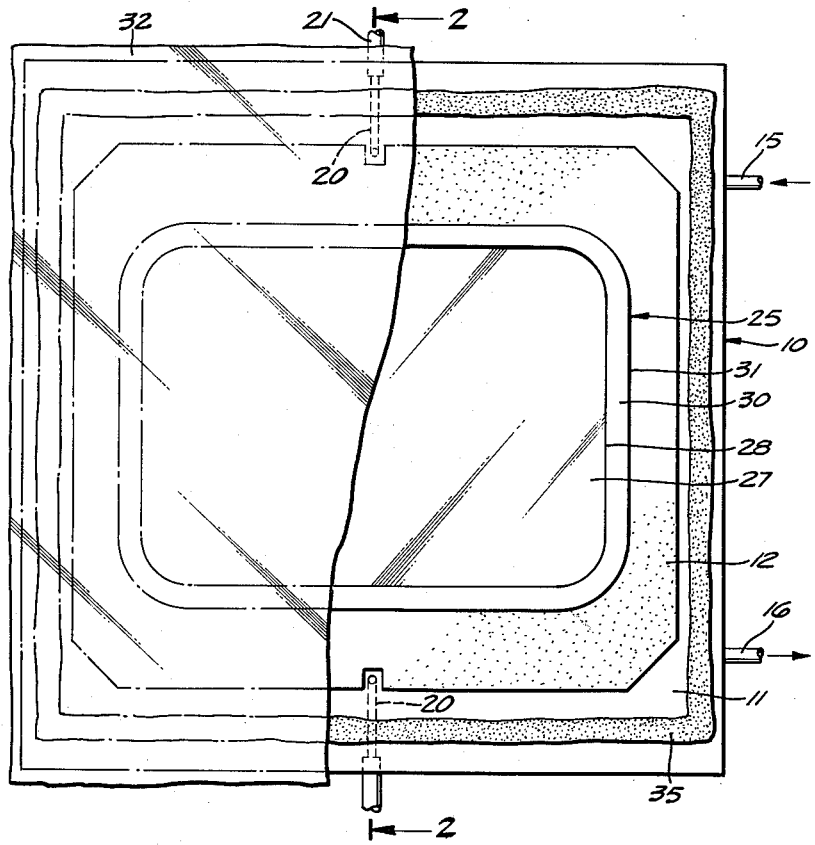
FIGURE 1 is a top plan view of a preferred form of the apparatus of this invention.
Figure 2:
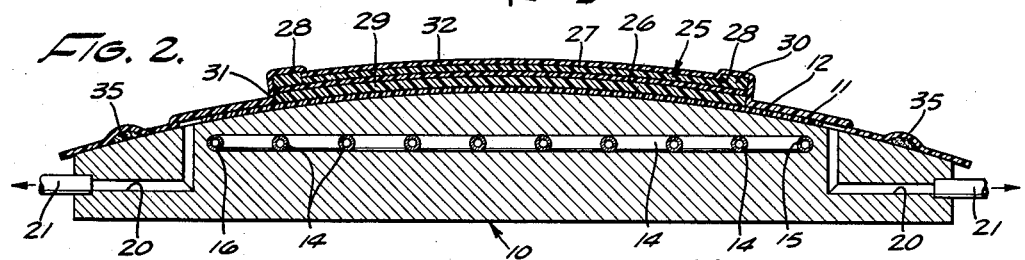
FIGURE 2 is a sectional elevation taken substantially on the line 2—2 of FIGURE 1.
Figure 3A:
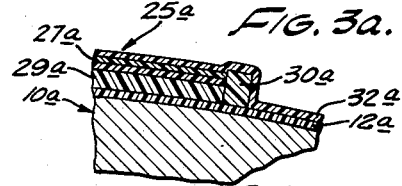
FIGURE 3a is a fragmentary sectional elevation illustrating a modified form of the invention, but otherwise similar to FIGURE 2.
Figure 3:
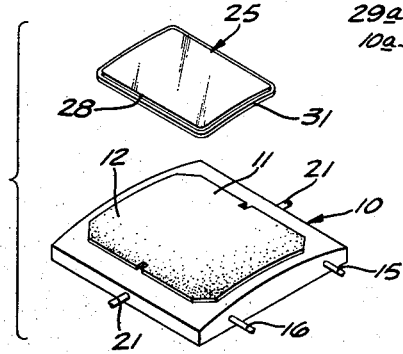
FIGURE 3 is an exploded perspective view of the form die and the contoured sheet formed thereby.

Referring now to the drawings, a preferred form of the apparatus of this invention is illustrated in FIGURES 1–3 and includes a male form die 10 having an upper die face 11 accurately contoured to the shape of the finished part to be formed. Secured to the die face is a pad 12 of rubber felt or other suitable cushioning material and having a uniform thickness so as to maintain the proper desired contour.

Preferably the die 10 is provided with coils 14 for circulation of cooling water therethrough, and through water inlet and outlet lines 15 and 16 communicating with the coils. Means are provided for drawing a vacuum on the upper die face, and as shown in the drawings, these means may include a pair of conduits 20 which communicate with vacuum lines 21.

In carrying out the process of this invention, the blank or flat sheet of transparent cross-linked plastic is first machined or otherwise finished to the desired configuration and the blank is then heated to the forming temperature. As a specific example, the sheet or blank 25 shown in the drawings is a polyester laminate, having a vinyl butyl interlayer 26, and sold under the trademark "Sierracin" by The Sierracin Corporation of Los Angeles, California. The blank, which is to be formed into a window for a commercial airliner, is first machined and polished in the flat condition to the peripheral shape shown, with the upper face 27 of the laminate cut back about its periphery to form a continuous edge 28. This cut-back portion is required only by reason of the design of the specific window being formed.

After the machining and polishing operations, the "Sierracin" blank is heated in an oven at 280° F. for about 130 minutes, and immediately upon withdrawal from the oven, is placed on the pad 12 as shown. A ring 30, which may be of a relatively flexible material such as polyethylene and shaped to conform to the outer edge 31 of the lower face 29 of the laminate and the edge 28 of the upper face, is placed in the position shown. A thin film 32 of a flexible, air-impervious material, such as polyvinyl alcohol, is then placed over the sheet 25 and covering the entire face of the die 10. The film is secured and sealed to the die face by means of a ring of a pressure-sensitive adhesive material 35, preferably a heavy paste of zinc chromate.

A vacuum is then pulled through the conduits 20, drawing the film 32 tightly against the sheet 25 and maintaining the hot sheet in the curved form in contact with the die pad 12. For a relatively simple contour such as that shown in FIGURES 1–3, a vacuum of as low as 11 inches may be used, the vacuum being maintained for about 3 hours, with circulation of cooling water through the coils 14. At the end of this time, the sheet 25 has become set in the desired contoured form. Utilizing the above-described method, transparent sheets of polyester plastic may be readily formed into curved articles without any change in the optical properties of the sheets. The thin film 32 when placed under a vacuum permits uniform application of pressure onto the sheet to be formed so that no points or areas of excessive pressure are present to cause distortion of the finished sheet. The use of the ring 30 is an important feature of the invention in that it maintains the film out of contact with the upper peripheral edge of the sheet and functions as a cushion against pressures transmitted by the film 32 which would otherwise tend to force the edges of the upper face 27 downwardly and to thus compress and distort the portions of the vinyl interlayer adjacent such edges.

A modified form of the invention is illustrated in FIGURE 3a, wherein the only substantial difference from that of FIGURES 1–3 resides in the configuration of the transparent sheet to be formed. Here the polyester sheet 25a differs from the sheet 25 in that the upper face 27a is not cut back as is the face 27, but rather is of the same area as the lower face 29a, and the cushion ring 30a is placed directly upon the pad 12a, the inner surface of the ring being in contact with the peripheral edge of the sheet. The method of operation utilizing the apparatus of FIGURE 3a is the same as described above in connection with FIGURES 1–3.

A further modified form of the invention is illustrated in FIGURES 4–8. The apparatus of this form of the invention is especially designed to be utilized in forming transparent polyester sheets into shapes having relatively sharp curves, and includes a female form die 40, preferably formed of a phenolic material and mounted on a framework generally indicated 41. The framework includes a plurality of horizontal tubular members 42 and tubular legs 43, and is supported on a plurality of caster wheels 45 for convenience in moving the die about upon the plant floor. The die face 46 is accurately contoured to the shape of the finished part to be formed, and secured to the die face is a pad 47 of rubber felt or other suitable cushioning material, the pad having a uniform thickness so as to maintain the proper desired contour.

Means are provided for drawing a vacuum on the upper die face, and as shown in the drawings, these means may include a plurality of conduits 50 which communicate with vacuum lines 51.

In carrying out the process of this modified form of the invention, the blank or flat sheet 55 of transparent polyester plastic is first machined and finished to the triangular configuration shown. As shown best in FIGURE 6, the blank comprises upper and lower faces 57 and 58 and an interlayer 59 of vinyl butyrate, the edges of the upper face, which edges form the sides of the triangle, being cut back for a purpose to be described below. The blank is further modified by cutting back the outer portions of the interlayer 59 lying above the sides of the lower face 58, and substituting for those portions of the interlayer a relatively rigid material, such as the strips 60 of polyester-impregnated nylon cloth laminate, the strips being firmly secured in place by means of a resinous adhesive. The edges of the upper and lower faces 57 and 58, which edges form the apex and base of the triangle, are rounded as shown in FIGURE 8.

The polyester blank 55 is then heated in an oven at 280° F. for 130 minutes, and immediately upon withdrawal from the oven is placed on the pad 47 in the position shown in FIGURE 6, the form die assembly preferably having been previously pre-heated in a hot room at a temperature of about 140° F. A thin film 61 of polyvinyl alcohol is then placed over the blank 55 and secured and sealed to the die face by means of the zinc chromate pressure-sensitive adhesive 62.

A vacuum is then pulled through the conduits 50, and also through a vacuum line 65 inserted through the adhesive 62 adjacent the apex of the die, thus drawing the film 61 tightly against the polyester blank and distorting the sheet to the position of FIGURE 7.

Means are provided for applying, at this stage, pressure to the side edges of the blank, and particularly to the side edges 70 and 71 of the strips 60 and lower face 58, respectively, in directions approximately perpendicular to the planes of such edges. As shown in the drawings, these means may include an A frame 75 comprising a pair of side frame members 76 and a cross frame member 77. A plurality of screw members 78 provided with handles 79 at the upper ends thereof extend through spaced apertures in the members 76 and engage with threaded nuts 80 welded to the members 76.

Means are provided for removably securing the edge pressure means to the die framework 41 and, as shown in FIGURE 4, these means may include a pin 85 which extends through apertures (not shown) in a bracket 86 depending from the apex of the A frame, and through an aperture (not shown) in the framework 41. A pair of additional pins 89 are provided, one at the rear end of each of the members 76, each extending through an aperture (not shown) in a bracket 90 secured to the appropriate member 76, and through an aperture (not shown) in the framework 41.

The edge pressure means includes a pair of pressure bar assemblies 100, each comprising a bar 101 adapted to contact the edges 70 and 71 of the blank (through the film 61), and an angle member 102.

Returning now to the description of the process, immediately upon forming the blank to the position shown in FIGURE 7, the edge pressure means described above are assembled with the framework as shown in FIGURES 4 and 7. Pressure is then applied, by turning only the two screw members 78 closest to the apex of the assembly, the edge pressure forcing the blank downwardly until the apex area of the blank is bottomed in the die (see FIGURE 5). The remainder of the screw members are then tightened to bottom the entire blank in the die. It will be noted that by reason of the cut-backs on either side of the top face 57, no edge pressure is applied to this relatively thin face, but that due to the greater relative movement of the lower face 58 during the forming operation, the side edges of the upper and lower faces become substantially aligned.

After the blank has been fully bottomed in and conforms to the contour of the die as described above, a high vacuum (about 22 inches) is maintained in the conduits 50 and line 65 for about 12 hours to permit the blank to set through cooling thereof. Due to shrinkage of the material of the blank, the screw members 78 are tightened at least every 15 minutes for the first two hours of this cooling period.

The part thus formed possesses substantially the exact contour of the die and has excellent optical properties. Due to the considerable changes in the areas of the sides during the forming operation, the sides and edges should be re-finished to provide for installation of edge attachments and to obtain the desired final dimensions. The initial finishing as described above is important in that the curved edges of the apex and base have been found to resist any tendency of the polyester to craze or chip during the forming operation. As explained above, the cut-backs on the upper face of the laminate permit substantial alignment of the edges after forming. Additionally, the nylon laminate strips 60 provide additional surface area for application of the edge pressure and protect the vinyl interlayer from distortion due to such edge pressure and the pressure of the vinyl film 61.

Having fully described our invention, it is to be understood that we do not wish to be limited to the details set forth but our invention is of the full scope of the appended claims.

We claim:

1. A method of forming a sheet of transparent cross-linked plastic into a curved article, which comprises heating the sheet to the forming temperature, applying said sheet over a female die having a forming surface contoured to the shape of the curved article, enclosing said sheet and said die surface in a thin flexible film, evacuating a portion of the air from the space between said film and said die surface whereby said sheet is partially formed, applying pressure to at least two opposed edges of said sheet to force the sheet into contact with said die surface, and maintaining said evacuated condition and said edge pressure until said sheet has cooled to the set condition.

2. A method of forming a sheet of transparent cross-linked plastic into a curved article, which comprises heating the sheet to the forming temperature, applying said sheet over a female die having a forming surface contoured to the shape of the curved article, enclosing said sheet and said die surface in a thin flexible film, evacuating a portion of the air from the space between said film and said die surface whereby said sheet is partially formed, applying pressure to at least two opposed edges of said sheet in directions approximately perpendicular to the planes of said edges to force the sheet into contact with said die surface, and maintaining said evacuated condition and said edge pressure until said sheet has cooled to the set condition.

3. A method of forming a sheet of transparent polyester plastic laminate, said laminate comprising a thermoplastic interlayer and at least one upper and lower polyester face, into a curved article, which comprises heating the sheet to the forming temperature, applying said sheet over a female die having a forming surface contoured to the shape of the curved article, enclosing said sheet and said die surface in a thin flexible film, evacuating a portion of the air from the space between said film and said die surface whereby said sheet is partially formed, applying pressure to at least two opposed edges of said sheet to force the sheet into contact with said die surface, and maintaining said evacuated condition and said edge pressure until said sheet has cooled to the set condition.

4. A method of forming a sheet of transparent polyester plastic laminate, said laminate comprising a thermoplastic interlayer and at least one upper and lower polyester face, into a curved article, which comprises cutting back the peripheral edge of the upper face, heating the sheet to the forming temperature, applying said sheet over a female die having a forming surface contoured to the shape of the curved article, enclosing said sheet and said die surface in a thin flexible film, evacuating a portion of the air from the space between said film and said die surface whereby said sheet is partially formed, applying pressure to at least two opposed edges of said lower face to force the sheet into contact with said die surface, and maintaining said evacuated condition and said edge pressure until said sheet has cooled to the set condition.

5. A method of forming a sheet of transparent polyester plastic laminate, said laminate comprising a thermoplastic interlayer and at least one upper and lower polyester face, into a curved article, which comprises cutting back the peripheral edge of the upper face, heating the sheet to the forming temperature, applying said sheet over a female die having a forming surface contoured to the shape of the curved article, enclosing said sheet and said die surface in a thin flexible film, evacuating a portion of the air from the space between said film and said die surface whereby said sheet is partially formed, applying pressure to at least two opposed edges of said lower face in directions approximately perpendicular to the planes of said edges to force the sheet into contact with said die surface, and maintaining said evacuated condition and said edge pressure until said sheet has cooled to the set condition.

6. The method of forming a plastic sheet comprising heating the sheet to a plastic condition, arranging the heated sheet in a substantially U-shaped die to have a surface of said sheet at the concave face of said die and to have two accessible edges, exerting a differential fluid pressure to the surface of the sheet and compression forces to said edges of the heated sheet to force the sheet into conformance with the concave die face.

7. The method of forming a plastic sheet part comprising heating the part to a plastic condition, arranging the heated part in a die to have a surface at a die face and to have two accessible edges, exerting fluid pressure on the other surface of the part and compression forces to said edges of the heated part to force the part into conformance with the die face.

8. The method of forming a plastic sheet part comprising heating the part to a plastic condition, arranging the heated part in a die to have a surface at a die face and to have two accessible edges, exerting fluid pressure on the other surface of the part and compression forces to given regions of said edges of the heated part to force the part into conformance with the die face, said regions bearing such relation to the contours of the die face as to cause said pressure and said forces to promote flow of the material of the part into uniform conformance with the die face.

9. The method of forming a plastic sheet part comprising heating the part to a plastic condition, arranging the heated part in a die to have a surface at a die face and to have two accessible edges, simultaneously exerting (1) fluid pressure on the other surface of the part and (2) compression forces to said edges of the heated part to force the part into conformance with the die face.

References Cited in the file of this patent

UNITED STATES PATENTS

| | | |
|---|---|---|
| 208,097 | House | Sept. 17, 1878 |
| 843,854 | Waterman | Feb. 12, 1907 |
| 1,063,498 | Beugler | June 3, 1913 |
| 1,793,603 | Frederick | Feb. 24, 1931 |
| 2,330,349 | Galey | Sept. 28, 1943 |
| 2,380,573 | Beasecker | July 31, 1945 |
| 2,484,656 | Sikka et al. | Oct. 11, 1949 |
| 2,517,701 | Oettinger | Aug. 8, 1950 |
| 2,729,032 | White | Jan. 3, 1956 |

FOREIGN PATENTS

| | | |
|---|---|---|
| 515 134 | Canada | Aug. 2, 1955 |